United States Patent
Waters et al.

(10) Patent No.: US 6,357,394 B1
(45) Date of Patent: Mar. 19, 2002

(54) CAGE FOR HOUSING DANGEROUS ANIMALS

(75) Inventors: R. Mark Waters, St. Clairsville, OH (US); Gordon M. Burghardt, Knoxville, TN (US); Donna G. Layne, Kent, OH (US)

(73) Assignee: The University of Tennessee Research Corporation, Knoxville, TN (US)

( * ) Notice: Subject to any disclaimer, the term of this patent is extended or adjusted under 35 U.S.C. 154(b) by 0 days.

(21) Appl. No.: 09/327,112

(22) Filed: Jun. 7, 1999

(51) Int. Cl.[7] .............................. A01K 1/02; A01K 1/03; A01K 31/06
(52) U.S. Cl. ...................... 119/472; 119/463; 119/417; 119/452
(58) Field of Search .................................. 119/472, 453, 119/455, 474, 500, 480, 481, 452, 479, 462, 417, 463, 473

(56) References Cited

U.S. PATENT DOCUMENTS

| | | | | |
|---|---|---|---|---|
| 2,346,001 A | * | 4/1944 | Bate | 119/472 |
| 3,100,474 A | * | 8/1963 | Schneider | 119/472 |
| 3,815,549 A | * | 6/1974 | Opmeer | 119/472 |
| 4,834,801 A | * | 5/1989 | Kalla et al. | 119/417 |
| 5,048,459 A | * | 9/1991 | Niki et al. | 119/418 |
| 5,134,969 A | | 8/1992 | Mason et al. | 119/17 |
| 5,709,165 A | * | 1/1998 | Nurmikko | 119/51.01 |
| 5,842,439 A | * | 12/1998 | Selstad | 119/481 |
| 5,862,778 A | | 1/1999 | Matsumoto | 119/472 |

OTHER PUBLICATIONS

Frederic Frey, Chapter 2, "Captive Husbandry" in Biomedical and Surgical Aspects of Captive Reptile Husbandry (1991).

Coote, Breeding Colubrid Snakes, Mainly Lampropeltis, in Reptiles: Breeding, Behaviour, and Veterinary Aspects (1985).

* cited by examiner

Primary Examiner—Charles T. Jordan
Assistant Examiner—Judith A. Nelson
(74) Attorney, Agent, or Firm—Howard Eisenberg, Esq.

(57) ABSTRACT

A cage for housing animals, particularly for dangerous animals like venomous snakes, is disclosed. The cage has at least two compartments, one of which is an externally sealable drawer that can be removed from the cage by sliding it from the other component, thus permitting removal of the animal from the cage without handling the animal.

28 Claims, 2 Drawing Sheets

CAGE FOR HOUSING DANGEROUS ANIMALS

FIELD OF THE INVENTION

The present invention relates to the field of housing non-human animals, particularly to the field of handling non-human animals that are potentially dangerous to humans, such as venomous snakes.

BACKGROUND OF THE INVENTION

Maintaining animals in non-natural environments, such as in zoos or laboratories, presents several problems to the keepers of the animals. In addition to providing a suitable environment for the animals, a keeper must ensure the safety of persons who study or care for the animals. For several species, there are guidelines that researchers must follow in the housing of the animals, such as those of the American Association for the Accreditation of Laboratory Animal Care (AAALAC).

Housing for laboratory animals must meet both safety and animal care requirements. In recent years, several commercial designs for the housing of reptiles have appeared. These vary from simple modified aquaria to elaborate polycarbonate vivaria. The majority of these cages, however, are intended for animals that are not dangerous to human handlers. Cages designed for housing dangerous animals, such as venomous snakes or aggressive mammals, are lacking.

In the laboratory, venomous snakes are often housed in cages that are modified glass aquaria with sliding, lockable tops. In order to move a snake from the cage, a snake hook is used. However, several types of snakes, such as the habu pit viper, do not sit passively on the hook. Rather, they use the hook as a branch and crawl towards the handler. Often, the snakes become agitated and even more dangerous when the handler attempts to prevent the snake from crawling on the snake hook.

A need exists for a cage system that permits an animal to be removed from the cage without danger to the animal or to the handler and without risk of escape of the animal. It must also provide a non-stressful living environment for the animal, permit the normal behavior of the animal to be observed, and meet the standards for animal care required by the AAALAC.

Presently available cages fail to satisfy these needs. Frye, Frederic, Captive Husbandry, Chapter 2 of *Biomedical and Surgical Aspects of Captive Reptile Husbandry*, Vol. 1, pages 11 to 36, Krieger Publishing Co. Malabar, Fla. (1991) discloses a squeeze cage for snakes in which a panel is used to compress a snake and to crowd the animal into a corner of the cage. Openings in the cage permit an attendant to work on the immobilized animal. Immobilizing an animal in this way is frequently stressful to the animal and does not facilitate the removal of the animal from the cage. In order to do so, the animal must be grasped and placed in a separate confinement.

Mason et al., U.S. Pat. No. 5,134,969, disclose a cage for arboreal reptiles which can be divided into upper and lower or side-by-side compartments by the insertion of a removable panel. Each of the compartments has its own door to provide access to the individual compartment by an attendant. When in position, the panel prevents an animal from exiting a compartment in which it is confined and entering the other compartment. The cage of Mason does not disclose a way to safely remove an animal from the cage. Nor does it provide a hide box, an element that is helpful in maintaining a natural and secure environment for a caged mammal or reptile.

Matsumoto U.S. Pat. No. 5,862,778, discloses a housing for small pet animals that contains a top cage portion and a bottom underground passage portion. A caged animal enters and exits the top and bottom portions by a small hole that connects the two portions. The bottom portion contains an underground passage that serves as a burrow that the animal may use as a nest-hole. A panel in the front of the bottom portion may be removed vertically to permit access for an attendant to the underground portion. Matsumoto does not disclose a way to confine an animal to either of the two portions of the cage. Additionally, Matsumoto does not disclose a system by which the animal may be safely removed from the cage, without the risk of injury to the attendant or the animal or of escape of the animal.

Coote, J., *Breeding Colubrid Snakes, Mainly Lampropeltis*, pp. 5–17 in Townson and Lawrence (eds.) Reptiles: Breeding, Behaviour and Veterinary Aspects, British Herpetological Society, London, U.K. (1985), discloses a cage for housing snakes. The cage includes a glass-doored upper portion connected to a lower portion by a length of drainpipe through which a snake may crawl from one portion of the cage to the other. The lower portion is a removable drawer that serves as a hide box for the snake and permits the snake to be removed from the cage. Because the fixed floor of the upper portion serves as roof of the drawer, the top of the drawer is always open when it is removed from the cage. Consequently, there is no means for preventing the animal from attacking an attendant or from escaping.

SUMMARY OF THE INVENTION

The present invention is a cage for agile or dangerous animals, such as rodents and snakes, that has at least two adjacent compartments having their interior space interconnected by an externally openable and closeable orifice and in which one of the compartments is a sealable drawer assembly that can be removed from the cage by sliding it out of the cage.

The cage of the invention provides a living space for an animal within a compartment that is connected to a second sealable compartment that can be used as a hide box and that can be removed from the cage. Thus, the cage of the invention provides a natural, stress-free living space and a second space, such as a hide-box, that permits an animal, such as a dangerous animal or an agile animal that can readily escape, like a snake or a rodent, to be removed from the cage without danger to an attendant or to the animal, without the risk of escape from the cage, and with a minimum of stress to the animal.

The two adjacent compartments may be vertically oriented to each other with an upper and lower compartment. The floor of the upper compartment and the roof of the lower compartment contain an opening that permits an animal to move from one compartment to the other. The opening is sealable and openable by an attendant outside the cage to restrict the animal to one or the other compartments or to allow the animal to travel freely between the compartments. One of the compartments, typically the lower compartment, is a drawer having a closed top containing the externally openable and closeable orifice. The drawer can be slid from the cage, permitting an animal within it to be removed from the cage without the risk of escape and without risk of injury to the attendant or to the animal.

Preferably, the orifice between the compartments is externally sealable and openable at either or both of the floor of the upper or roof of the lower compartment. In this way, an animal may be restrained in the lower compartment for removal from the cage or for maintenance of the upper compartment or may be restrained in the upper compartment while the lower compartment is removed from the cage for cleaning.

In an alternative embodiment, the compartments, including the sliding drawer compartment, are in horizontal orientation. That is, the two compartments are oriented side-by-side and the communicating orifice is situated in the adjacent vertical sides of the compartments.

DETAILED DESCRIPTION OF THE PREFERRED EMBODIMENT

The invention is a cage containing multiple compartments into which an animal may enter wherein at least one of the compartments is a removable drawer assembly that is externally sealable and openable. The cage of the invention permits an animal to be removed from the cage without stress to the animal and without danger of the escape of the animal or of injury to the animal or to an attendant.

In accordance with the invention, there is a cage assembly for retaining an animal including first and second compartments. The compartments substantially adjoin each other and communicate with each other by an opening in the portion of the second compartment adjoining the first compartment, which opening may be sealed or opened from outside the cage.

Figure 1:
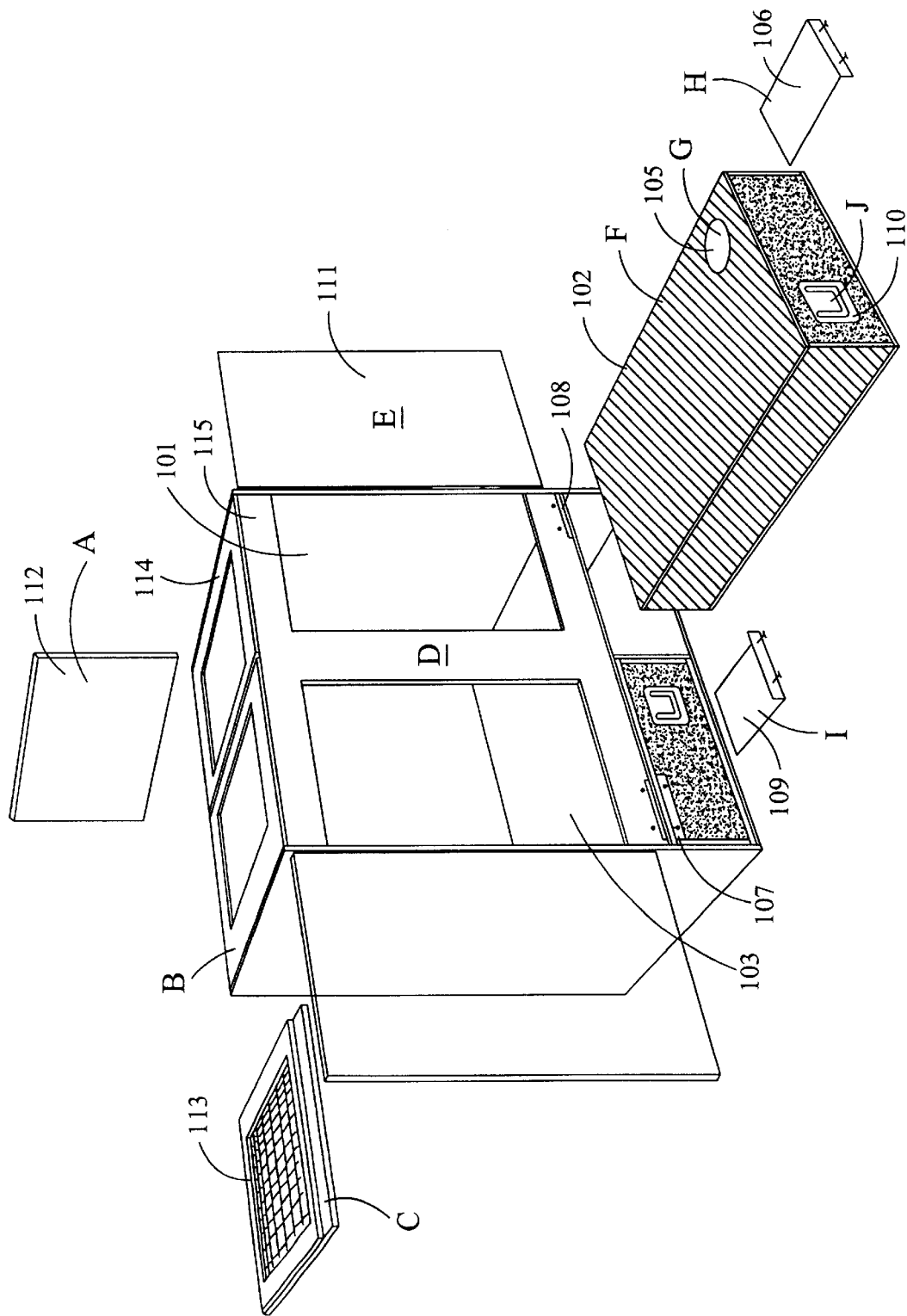
FIG. 1 is a diagrammatic view of a preferred embodiment of the cage of the invention.

FIG. 1 shows a preferred embodiment of the invention in which the cage is a cabinet having upper and lower compartments, in which one of the compartments includes a drawer assembly, the interior of which communicates with the interior of the other compartment by an opening that is openable and sealable from outside the cage. The cage of the invention includes a first compartment 101 that provides a living space for a captive animal and a second compartment 102 that is preferably positioned within the first compartment below the living space. The second compartment is a closed-top drawer that can be slid in and out of the first compartment 101. The living space is bounded by a floor 103 that separates it from the second compartment. The floor contains an orifice 104 that connects the interior of the living space within the first compartment 101 with the top of the second compartment 102. The top of the second compartment contains an orifice 105 that provides a communication between the interiors of the first 101 and second 102 compartments by communication with the orifice 104 in the floor 103 of the living space. The orifice 105 of the second compartment may be closed or opened by removal or insertion of a screwable plate 106 into a slot 107 that is accessible from outside the cage, such as at the front of the second compartment. Likewise, the orifice 104 of the first compartment is preferably openable and closeable from outside the cage, such as by a similar slot 108 and removable screwable plate 109, or alternatively may be fixedly open.

Other optional features of the preferred embodiment of the invention shown in FIG. 1 include a handle 110 to facilitate removal of the second compartment 102, one or more preferably lockable doors 111, preferably hinged, for access to the living space within the first compartment, an insertable panel 112 for dividing the interior of the first compartment 101 into multiple living spaces, and a closed or mesh lid 113 to provide access and ventilation to the living space. Preferably, the top 114 and front 115 of the first compartment form a lip to provide structural support and to form a modest barrier to exit from the cage when the doors 111 or lids 113 are open.

The two compartments may be vertically adjacent to each other, as shown in FIG. 1, or may be horizontally adjacent to one another. The opposing openings 104, 105 that communicate between the first and second compartments are necessarily in adjacent portions of the compartments. Thus, when the compartments are in vertical orientation, the openings are in the floor of one compartment and in the roof of the other compartment. The two compartments may also be oriented horizontally to each other. In this case, the openings 104, 105 are positioned in adjacent opposing sides of the two compartments.

Figure 2:
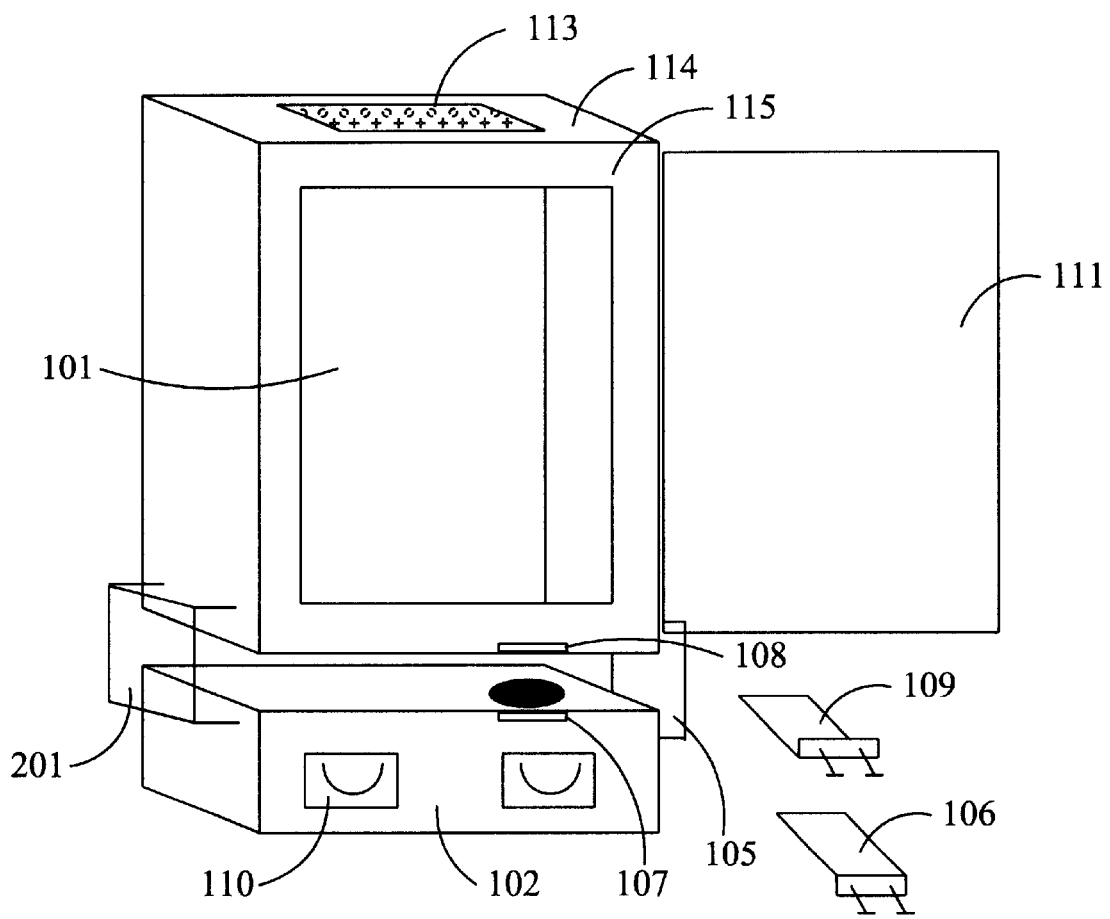
FIG. 2 is a diagrammatic view of an alternate embodiment of the cage of the invention.

FIG. 2 shows an alternate embodiment of the cage of the invention in which the first 101 and second 102 compartments are contained within separate units that are stacked one atop the other or arranged side by side. Preferably, the two compartments are joined by an external brace 201 that may include a roller assembly to facilitate sliding of the second component.

The cage may be made of any suitable material but is preferably made of materials that meet AAALAC guidelines, such as polycarbonate, acrylic, polycarbonate, methyl methacrylate, or other plastic panels secured chemically such as with methylene chloride, or with plastic or metal hardware such as stainless steel screws. It is preferred to use transparent panels to permit unrestricted viewing of the animal within the cage. However, an opaque material, such as plastic, wood or metal, such as steel, may be used if desired.

The majority of the first compartment typically is used as a living space for the captive animal and may contain items for the use of the animal, such as branches, water bowls, and exercise wheels. Use of a transparent plastic for the exterior walls permits light to enter the cage and allows for viewing the behavior of the animal.

The second compartment may be designed for use as a hide box into which the animal may retreat. In a preferred embodiment, the top, bottom, and sides of the hide box are constructed of an opaque material, such as metal or dark plastic to provide a dark retreat. The front and back of the hide box are preferably a dark red, transparent plastic, such as acrylic, to provide a measure of isolation to the animal within the hide box while permitting a keeper to check on the condition and behavior of the animal.

Preferably, the back panel of the hide box is removeable, such as by a sliding or a hinged panel that may be held in place by thumbscrews. This permits removal of the snake from the hide box, if desired, and facilitates cleaning.

As shown in FIG. 2, the cage of the invention may contain one fixed compartment and one removable compartment. If desired, however, and as shown in FIG. 1, the cage may contain more than one fixed compartments and may contain more than one removable compartments. Each of the fixed compartments may be in communication with a removable compartment. Alternatively, a fixed compartment may have no communication with a removable compartment. In this case, it is preferred that this fixed compartment communicate with a fixed compartment that is in communication with a removable compartment. In a most preferred embodiment as shown in FIG. 1, the cage is divided into three spaces, an upper living space and two lower retreats. The upper living space can be further divided by insertion of a panel.

The doors open to permit access to the living space of the first, that is the fixed, compartment and preferably do not overly the front of the drawer assembly. That is, preferably the doors are not required to be opened to gain access to the drawer assembly.

The opening between the compartments is of a size and shape sufficient to permit an animal to travel through the opening from one compartment to the other. The openings are typically circular, but may be any shape such as oval or rectangular. The size of the opening may be varied depending on the size of the animal to be restrained within the cage. As an example, for a small rodent such as a hamster, the opening may have a diameter of between about 2.5 to 5 cm. For a snake, the opening may be between 2.5 to 19 cm in diameter, such as about 6 to 7 cm in diameter. The opening may be smaller or larger than these examples, if desired.

It is preferred that the opening should not occupy the major portion of the area of the floor of the fixed compartment. This is to provide adequate space for the animals to ambulate and for water and food bowls and other useful accessories like branches or exercise wheels.

Although the above description contains many specificities, they should not be interpreted as limitations on the scope of the invention, but rather as illustrations. One skilled in the art will understand that many variations of the invention are possible and that these variations are to be included within the scope of the following claims.

What is claimed is:

1. A cage for housing an animal comprising:
    (a) a fixed enclosed compartment,
    (b) a removable enclosed compartment adjacent to and in slidable contact with said fixed compartment,
    (c) an orifice in said fixed compartment adjacent to said removable compartment, and
    (d) an externally openable and closeable orifice in said removable compartment in opposition to said orifice of said fixed compartment that connects the interiors of said first and second compartments and which connection provides a passageway for said animal between said fixed and removable compartments,
wherein said removable compartment is removed from said cage by horizontally sliding it from said fixed compartment.

2. The cage of claim 1 which further comprises an externally openable and closeable orifice in said fixed compartment in opposition to said orifice in said removable compartment.

3. The cage of claim 1 wherein said removable compartment is positioned within said fixed compartment.

4. The cage of claim 1 which further comprises a slot in said removable compartment connecting the interior and exterior of said removable compartment to permit the introduction of a plate to close said orifice wherein, upon the introduction of said plate, said orifice in said removable compartment is closed.

5. The cage of claim 2 which further comprises a slot in said fixed compartment connecting the interior and exterior of said fixed compartment to permit the introduction of a plate to close said orifice in said fixed compartment wherein, upon the introduction of said plate, said orifice in said fixed compartment is closed.

6. The cage of claim 1 wherein the fixed and removable compartments are positioned one above the other.

7. The cage of claim 1 wherein said removable compartment is a drawer that is substantially sealed when said orifice in said removable compartment is closed.

8. The cage of claim 7 wherein the back of said drawer is removable.

9. The cage of claim 1 wherein the fixed enclosure comprises a door.

10. A cage for housing an animal comprising a cabinet comprising a compartment, a closed drawer slidably connected to said compartment, a passageway for said animal between said compartment and said drawer, and an externally openable and closeable aperture in said drawer at the passageway that connects the interior of said drawer to the interior of said compartment.

11. The cage of claim 10 which further comprises an externally openable and closeable aperture in said compartment opposedly situated from said aperture in said drawer.

12. A cage for housing an animal comprising:
    (a) a first compartment,
    (b) a second compartment comprising a drawer slidably connected to said first compartment, and
    (c) a passageway for said animal between said first compartment and said drawer that is openable and sealable from outside the cage.

13. The cage of claim 12 wherein said passageway is sealed by enclosing the interior of said drawer.

14. The cage of claim 12 wherein said passageway is sealed by closing said passageway at the first compartment.

15. A cage comprising a first compartment and a second compartment adjacent to said first compartment, wherein the interior space of the first and second compartments is interconnected by an externally openable and closeable passageway for an animal held within said cage and wherein one of the compartments is a sealable and a slidably removable drawer assembly.

16. The cage of claim 15 wherein the first and second compartments are vertically oriented with respect to each other.

17. The cage of claim 4 which further comprises a slot in said fixed compartment connecting the interior and exterior of said fixed compartment to permit the introduction of a plate to close said orifice in said fixed compartment wherein, upon the introduction of said plate, said orifice in said fixed compartment is closed.

18. A method for housing an animal comprising:
    providing a cage comprising
    (a) a compartment,
    (b) a substantially sealed drawer in slidable contact with said compartment,
    (c) a first orifice in said compartment,
    (d) a second orifice in said drawer assembly wherein when said first and second orifices define a passageway for said animal between said compartment and said drawer assembly when the drawer assembly is in place in contact with said compartment, and
    (e) a removable plate that can be caused to seal or open said second orifice by an operator from outside said cage,
    and placing said animal within said cage.

19. The method of claim 18 wherein said animal is a snake.

20. The method of claim 18 wherein said animal is a rodent.

21. The method of claim 18 wherein said drawer is situated within said compartment.

22. The method of claim 18 wherein said slidable contact between said compartment and said drawer is horizontal.

23. The method of claim 18 which further comprises permitting or causing said animal to move from said compartment into said drawer.

24. A method for transporting an animal comprising:
(1) housing said animal in a cage comprising:
   (a) a compartment,
   (b) a substantially sealed drawer in slidable contact with said compartment,
   (c) a first orifice in said compartment,
   (d) a second orifice in said drawer wherein when said first and second orifices define a passageway for said animal between said compartment and said drawer when the drawer is in place in contact with said compartment, and
   (e) a removable plate that can be caused to seal or open said second orifice by an operator from outside said cage,
(2) causing or permitting said animal to enter said drawer through said passageway,
(3) sealing said second orifice in said drawer while said animal is within said drawer, and
(4) transporting said sealed drawer containing said animal from said cage.

25. The method of claim 24 wherein said animal is a snake.

26. The method of claim 24 wherein said animal is a rodent.

27. The method of claim 24 wherein said drawer is situated within said compartment.

28. The method of claim 24 wherein said slidable contact between said compartment and said drawer is horizontal.

* * * * *